(12) United States Patent
Grabbe et al.

(10) Patent No.: US 8,188,919 B2
(45) Date of Patent: May 29, 2012

(54) GLOBALLY-CONVERGENT GEO-LOCATION ALGORITHM

(75) Inventors: Michael T. Grabbe, Columbia, MD (US); Bryan Lloyd Westcott, Rockwall, TX (US)

(73) Assignee: L3 Communications Integrated Systems, L.P., Greenville, TX (US)

(*) Notice: Subject to any disclaimer, the term of this patent is extended or adjusted under 35 U.S.C. 154(b) by 359 days.

(21) Appl. No.: 12/485,409

(22) Filed: Jun. 16, 2009

(65) Prior Publication Data

US 2010/0315290 A1 Dec. 16, 2010

(51) Int. Cl.
*G01S 3/02* (2006.01)
*G01S 1/08* (2006.01)
*G01S 5/04* (2006.01)
(52) U.S. Cl. .................. 342/450; 342/386; 342/442
(58) Field of Classification Search .............. 342/386, 342/442, 443, 450, 451, 457, 465; 455/456.3, 455/457
See application file for complete search history.

(56) References Cited

U.S. PATENT DOCUMENTS

| | | | |
|---|---|---|---|
| 5,870,056 A * | 2/1999 | Fowler | 342/424 |
| 5,930,202 A | 7/1999 | Duckworth et al. | |
| 7,292,501 B2 | 11/2007 | Barger | |
| 7,535,420 B2 | 5/2009 | Grabbe | |
| 7,551,138 B2 | 6/2009 | Grabbe | |
| 2007/0010956 A1 | 1/2007 | Nerguizian et al. | |

* cited by examiner

*Primary Examiner* — Dao Phan
(74) *Attorney, Agent, or Firm* — Hovey Williams LLP

(57) ABSTRACT

A system and method for estimating a geolocation of a non-cooperative target using any reasonable target location estimate. Collectors may acquire actual signal measurements including a direction of arrival (DOA), a target range, a time difference of arrival (TDOA), a range rate, a range sum, and/or a frequency difference of arrival (FDOA). A processing device may receive the actual signal measurements and navigational data regarding the collectors. Then, the processing device may calculate an estimated target location as a solution to a nonlinear optimization problem where an objective function to be minimized is a weighted sum-of-squares of differences between the actual signal measurements and calculated values corresponding to signal measurements that theoretically should be produced for a particular target location. The algorithm used to solve this problem may be a globally convergent algorithm, such as a Levenberg-Marquardt algorithm.

17 Claims, 6 Drawing Sheets

GLOBALLY-CONVERGENT GEO-LOCATION ALGORITHM

BACKGROUND

1. Field

Embodiments of the present invention relate to geolocation of a non-cooperative target. More particularly, embodiments of the present invention relate to a system and method for using a globally convergent algorithm to determine the geolocation of a non-cooperative target.

2. Related Art

In order to locate a stationary ground target, sensor measurements and collection platform navigation data are processed either by a batch processing algorithm or a recursive estimator such as a Kalman filter. Such algorithms compute a target location estimate as the solution to a minimum variance optimization problem, with the answer being the point which best fits the sensor and navigation data in the weighted least-squares sense.

Nearly all geo-location algorithms, such as that used by a recursive estimator called the Extended Kalman Filter, require an initial target location estimate. However, when a limited number of sensor measurements are available, such as when using only a time difference of arrival (TDOA) and frequency difference of arrival (FDOA) of a signal received by two sensors, determining an initial location estimate can be very difficult due to the geometry of the measurements. For example, the isogram associated with a TDOA measurement is a branch of a hyperbola, and the isogram associated with an FDOA measurement is the locus of roots of a $4^{th}$ order polynomial. For such measurements, the initial location estimate is often computed analytically as the intersection of the planar approximation of two measurement isograms. This is a difficult problem to solve, and if solved, can produce zero, one, or multiple intersections because of sensor errors and platform-target geometry.

Newton's Method is a nonlinear optimization algorithm, but is reliable only when an objective function being minimized is convex. In general, a function is convex at a point if and only if its Hessian matrix is positive semidefinite at that point. A lack of convexity at an initial location estimate can result in Newton's Method moving the location estimate away from the solution instead of towards it. Although the objective function being minimized for geo-location is typically convex near the solution, it may not be convex at distant points. The degree of convexity of the objective function is determined by the type of sensor measurements, number of measurements, and platform-target geometry. For example, when two collection platforms with poor geometry are using one TDOA and one FDOA measurement to locate a target, the objective function may possess a "saddle point", i.e., the objective function will increase in some directions and decrease in others. The presence of a saddle point can result in divergence by Newton's Method unless the initial location estimate is close to the solution.

The Iterated Least-Squares algorithm is a simplification of Newton's Method in that the Hessian matrix is replaced with an approximation that is always at least positive semidefinite, if not positive definite. Although this guarantees that at each update the location estimate moves along a direction that initially does not increase the objective function, poor initialization can produce a huge change in the location estimate that overshoots the solution and results in convergence to a distant location.

SUMMARY

Embodiments of the present invention solve the above-mentioned problems and provide a distinct advance in the art of geolocation. More particularly, embodiments of the invention provide a system and method for reliably approximating a geolocation of a non-cooperative target using any reasonable target location estimate.

The system for determining the geolocation of a non-cooperative target may comprise one or more collectors configured to acquire signal measurements corresponding to signals emitted from the non-cooperative target and a processing device for receiving and processing signal measurements from the collectors in order to output a target location estimate. The processing device may comprise a Levenberg-Marquardt module configured for recursively applying a Levenberg-Marquardt algorithm to a set of data including the signal measurements. The processing device may further comprise a comparison module configured to output a most recent solution of the Levenberg-Marquardt algorithm once a particular condition is met.

The method for determining the geolocation of a non-cooperative target may comprise acquiring one or more actual signal measurements from the target with one or more collectors. The signal measurements may include a direction of arrival (DOA), a target range, a time difference of arrival (TDOA), a range rate, a range sum, and/or a frequency difference of arrival (FDOA). The method may further comprise receiving with a processing device the actual signal measurements and navigational data regarding the collectors. Then, the method may include calculating an estimated target location with the processing device as a solution to a nonlinear optimization problem where an objective function to be minimized is a weighted sum-of-squares of differences between the actual signal measurements and calculated values corresponding to signal measurements that theoretically should be produced for a particular target location. The algorithm used to solve this problem may be a globally convergent algorithm, such as a Levenberg-Marquardt algorithm. Finally, the method may comprise communicating the estimated target location to a user of the processing device or to another processing device.

This summary is provided to introduce a selection of concepts in a simplified form that are further described below in the detailed description. This summary is not intended to identify key features or essential features of the claimed subject matter, nor is it intended to be used to limit the scope of the claimed subject matter.

Other aspects and advantages of the present invention will be apparent from the following detailed description of the embodiments and the accompanying drawing figures.

BRIEF DESCRIPTION OF THE DRAWING FIGURES

Embodiments of the present invention is described in detail below with reference to the attached drawing figures, wherein.

Figure 1:
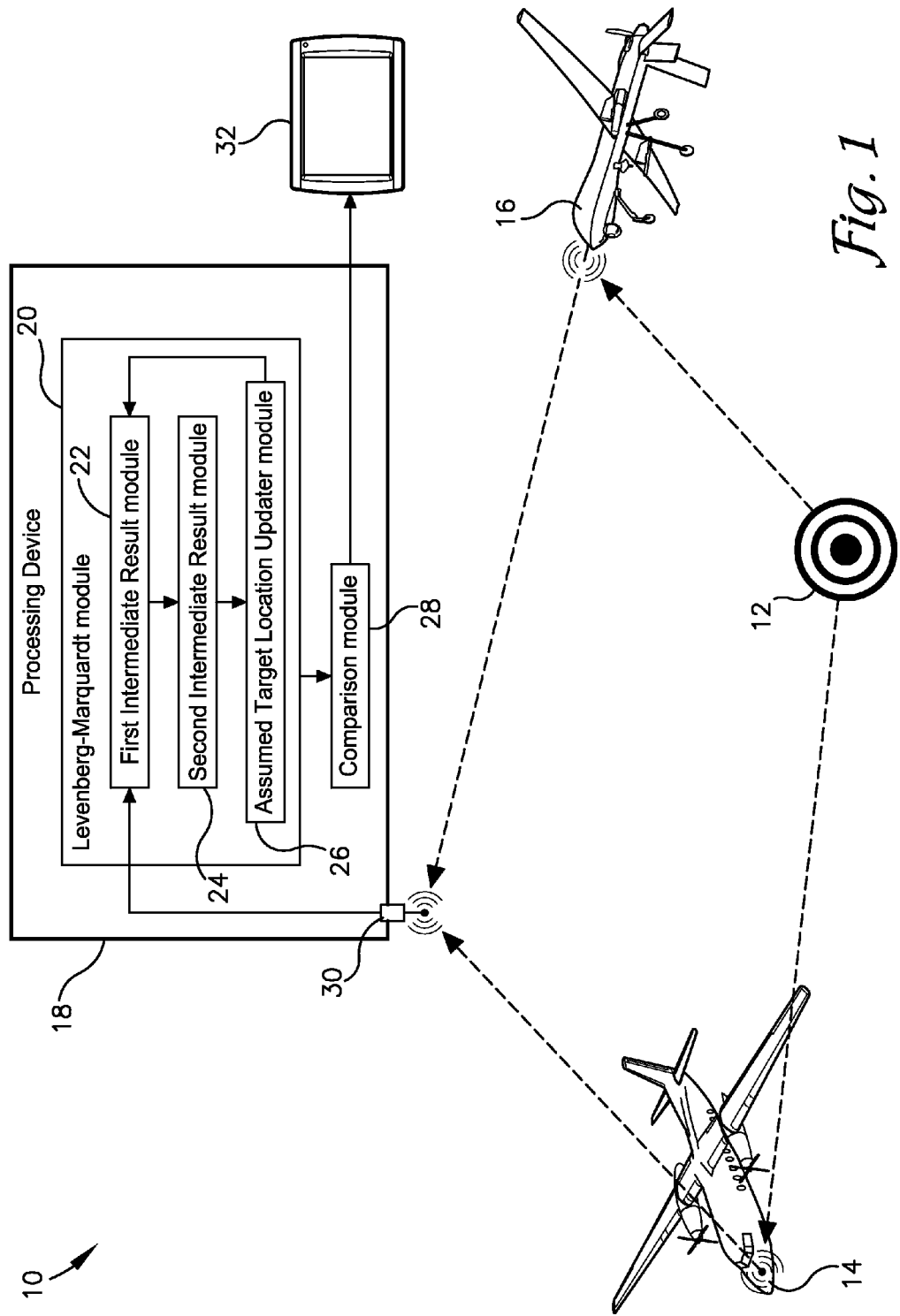
FIG. 1 is a schematic diagram of a target locating system constructed in accordance with an embodiment of the invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

Target Locating System Components:

FIG. 1 illustrates a target locating system 10 configured to estimate or approximate a geographic location or geo-location of a non-cooperative target 12, such as enemy aircraft, tank, missile, silo, etc. The system 10 may comprise one or more collectors 14, 16 for collecting one or more signals output by an emitter on the target 12 and a processing device 18 configured for applying a globally convergent algorithm to a nonlinear optimization problem using one or more measurements corresponding with the signals and outputting an estimated target location to a user or another electronic device.

The estimated target location may be a solution to the nonlinear optimization problem where an objective function to be minimized is a weighted sum-of-squares of differences between measurements from the collectors 14, 16 and measurement values that theoretically would be produced for a given estimated target location. An optimization algorithm is globally convergent if each update results in a decrease in an objective function to be minimized. Note that although such globally convergent algorithms continually decrease the objective function, they may still result in convergence to a local minimum that is not the global minimum. However, globally-convergent algorithms are not as sensitive to error and generally do not require as accurate an initial target location estimate as Newton's method or Iterated Least Squares algorithms. One example of a globally convergent algorithm is the Levenberg-Marquardt algorithm, further described herein.

The one or more collectors 14, 16 may be any type of receiver or antenna configured to sense signals transmitted through the air such as radio signals, cell phone signals, equivalents and the like. The collectors 14, 16 may be integrally and/or communicably coupled with the processing device 18 and/or an aircraft, unmanned aerial vehicle (UAV), a land vehicle, a marine vehicle, or any sensing or processing device. Alternatively, data collected by the collectors 14, 16 may be stored on a memory storage device or may be otherwise recorded and then directly or manually transferred to the processing device 18. The collectors 14, 16 may be located at different geographic locations from each other and may comprise different sensing hardware and/or software from each other. Furthermore, the collectors 14, 16 may contribute in differing degrees to error sigmas corresponding with each measured value. Error sigmas are used by the processing device 18 as later described herein.

The collectors 14, 16 may be configured to detect signals within a particular range of signal strength and/or a particular range of signal frequency. Furthermore, the collectors 14, 16 and/or the processing device 18 may be configured to independently or cooperatively determine one or more of the following measurements based on received signals and navigation data regarding the collectors 14, 16: direction of arrival (DOA), range, time difference of arrival (TDOA), range rate, range sum, and frequency difference of arrival (FDOA).

The navigation data may be, for example, geographic locations (latitude, longitude, and/or altitude) of the collectors 14, 16, as well as current velocity and heading information. The collectors 14, 16, for example, may be communicably and/or integrally coupled with a location determining device, such as a GPS receiver, to obtain navigation data related to the collectors 14, 16 and/or the vehicle or platform to which the collectors 14, 16 are attached.

TDOA may be equivalent to a measurement of range difference between two of the collectors 14, 16 and the target 12. FDOA may equivalent to a measurement of range rate difference between two of the collectors 14, 16 and the target 12. For each of these measurement types, the measurement may be a nonlinear function of the geographic location of the target 12. As a result, the estimated target location may be the solution to a nonlinear optimization problem where the objective function to be minimized may be the weighted sum-of-squares of differences between the measurements from the collectors 14, 16 and the values that would be produced for a particular estimated location of the target 12. Various algorithms used by the processing device 18 to solve for the estimated target location are described in detail below.

The processing device 18 may comprise any number and combination of processors, controllers, integrated circuits, programmable logic devices, or other data and signal processing devices for carrying out the functions described herein, and may additionally comprise one or more memory storage devices, transmitters, receivers, and/or communication busses. In one embodiment of the invention, the processing device 18 may be a field programmable gate array (FPGA), including a plurality of configurable logic elements and a plurality of configurable storage elements.

In various embodiments, the processing device 18 may implement a computer program and/or code segments to perform the functions described herein. The computer program may comprise a listing of executable instructions for implementing logical functions in the processing device 18. The computer program can be embodied in any computer readable medium for use by or in connection with an instruction execution system, apparatus, or device, and execute the instructions. In the context of this application, a "computer readable medium" can be any means that can contain, store, communicate, propagate, or transport the program for use by or in connection with the instruction execution system, apparatus, or device. The computer readable medium can be, for example, but not limited to, an electronic, magnetic, optical, electro magnetic, infrared, or semi conductor system, apparatus, device or propagation medium. More specific, although not inclusive, examples of the computer readable medium would include the following: a portable computer diskette, a random access memory (RAM), a read only memory (ROM), an erasable, programmable, read only memory (EPROM or flash memory), and a portable compact disk read only memory (CDROM), combinations thereof, and the like.

The one or more memory storage devices may be integral with the processing device 18, stand alone memory, or a combination of both. The memory may include, for example, removable and non-removable memory elements such as RAM, ROM, flash, magnetic, optical, USB memory devices, and/or other memory elements.

The processing device 18 may comprise a plurality of modules 20, 22, 24, 26, 28 for solving various portions of one or more algorithms described herein to determine the estimated target location. The modules 20-28 may be software or hardware modules or segments of the processing device 18 and may be formed from configurable logic elements, configurable storage elements, or any number and combination of processors, controllers, integrated circuits, programmable logic devices, or other data and signal processing devices. For example, the modules 20-28 may comprise a Levenberg-Marquardt module 20, a first intermediate result module 22, a second intermediate result module 24, an assumed target location updater module 26, and/or a comparison module 28.

The Levenberg-Marquardt module 20 may receive a set of data including a measurement vector z, an error covariance matrix, navigation data corresponding with at least one of the collectors 14, 16, and a current assumed target location. Any reasonable estimate of location coordinates may be used to initialize the current assumed target location. A reasonable estimate of location coordinates may be, for example, a location within the sensor range of the collectors 14, 16 at the time the signals are received, a location within a particular region monitored by the collectors 14, 16, etc. The measurement vector z may comprise values corresponding with measurements received and calculated by the collectors 14, 16, such as DOA, range, TDOA, range rate, range sum, and FDOA. The error covariance matrix may comprise values corresponding with a statistically determined error of each value within the measurement vector z.

The Levenberg-Marquardt module 20 may be configured to iteratively update an updated assumed target location using the set of data described above, the current assumed target location, and some embodiment of the Levenberg-Marquardt algorithm. In various embodiments of the invention, the Levenberg-Marquardt module 20 may be configured to recursively input the updated assumed target location into an equation (such as Equation 60 derived below) as the current assumed target location for a next iteration of calculating the updated assumed target location.

The Levenberg-Marquardt module may comprise or be communicably coupled with the first intermediate result module 22. The first intermediate result module 22 may be configured to calculate an h vector comprising values corresponding with what each value of the measurement vector z would equal if the signal was emitted from the current estimated target location. The first intermediate result module 22 may also be configured to subtract the h vector from the measurement vector z to solve for a first intermediate result.

The Levenberg-Marquardt module 20 may also comprise or be communicably coupled with the second intermediate result module 24. The second intermediate result module 24 may be configured to determine the product of the first intermediate result, an inverse of the measurement error covariance matrix corresponding to the measurement vector z, a transposed gradient of h evaluated at the current assumed target location, an inverse of a positive definite matrix $M_k$, and a positive scalar parameter $\alpha_k$ to solve for a second intermediate result. These variables are described in detail below.

The Levenberg-Marquardt module 20 may also comprise or be communicably coupled with the assumed target location updater module 26. The assumed target location updater module 26 may be configured to add the current assumed target location to the second intermediate result to solve for the updated assumed target location. The updated assumed target location may then be iteratively input back into the Levenberg-Marquardt module 20, or more specifically into the first intermediate result module 22, as the current assumed target location to calculate yet another updated assumed target location.

The comparison module 28 may be configured for outputting a most recent value of the updated assumed target location calculated by the Levenberg-Marquardt module 20 once a particular condition is met. The particular condition required by the comparison module 28 may correspond with particular stop criteria, as further described below.

In various embodiments of the invention, the processing device 18 may also comprise an input 30 which may comprise any device for receiving data from the collectors 14, 16 and sending the data to be processed by the processing device 18. The input 30 may comprise a receiver, an antenna, a jack, a data port, a memory card slot, a CD reader, a DVD reader, etc.

The target locating system 10 may further comprise a display 32. The display 32 may comprise a graphical interface operable to display visual graphics, images, text, etc. in response to external or internal processes and commands. For example, the display 32 may comprise conventional black and white, monochrome, or color display elements including CRT, TFT, LCD, and/or LED display devices. The display 32 may be coupled with or integral with the processing device 18 and may be operable to display various information corresponding to the target locating system 10, such as data from the collectors 14, 16 and the estimated target location output by the processing device 18.

However, the display 32 may be omitted from the target locating system 10 without departing from the scope of the invention. For example, the processing device 18 may output the estimated target location to another processing device (not shown), to another module within the processing device 18 to be used by other software or hardware configured to respond to estimated target locations, or to respond to an audio device configured to audibly communicate the estimated target location to a user.

Method of Solving for an Estimated Target Location:

The above-described target locating system 10 may be used to implement a method of estimating a geographic location of a non-cooperative target. The method broadly comprises the steps of acquiring actual signal measurements from the target 12 and navigational data regarding the collectors 14, 16. The method may also comprise calculating an estimated target location with the processing device using a globally convergent algorithm, such as the Levenberg-Marquardt algorithm, and outputting the estimated target location to a display or another processing device.

Figure 2:
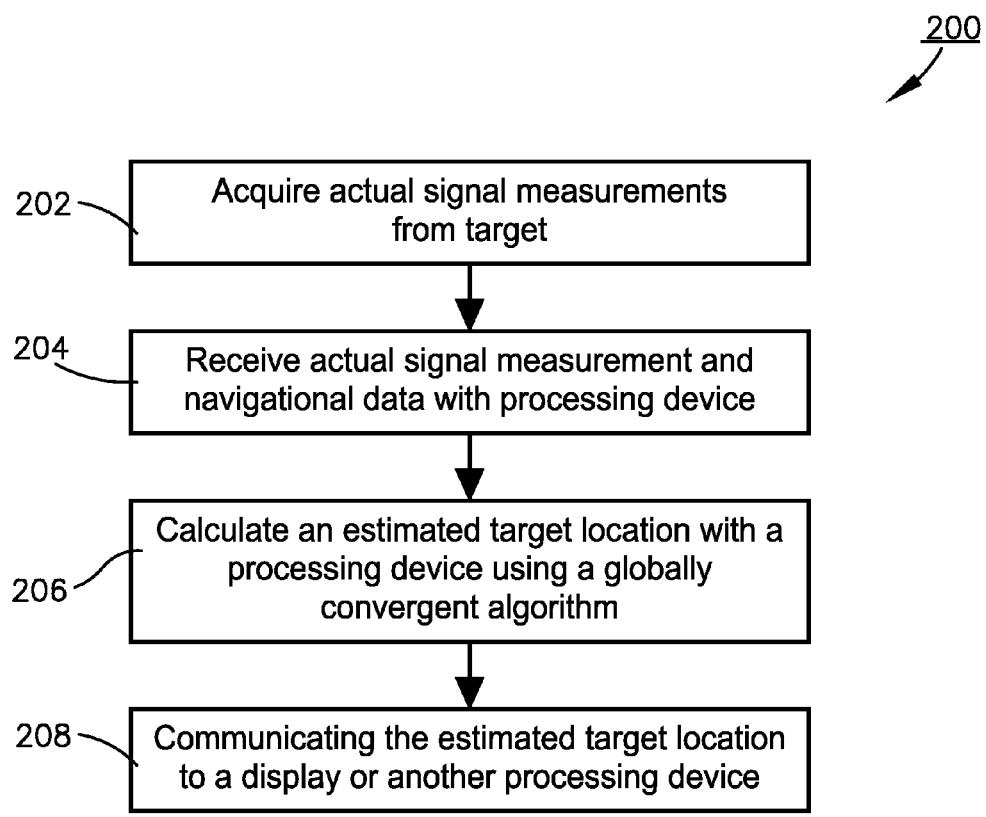
FIG. 2 is a flow chart of a method of determining a target location in accordance with an embodiment of the invention.
Figure 3:
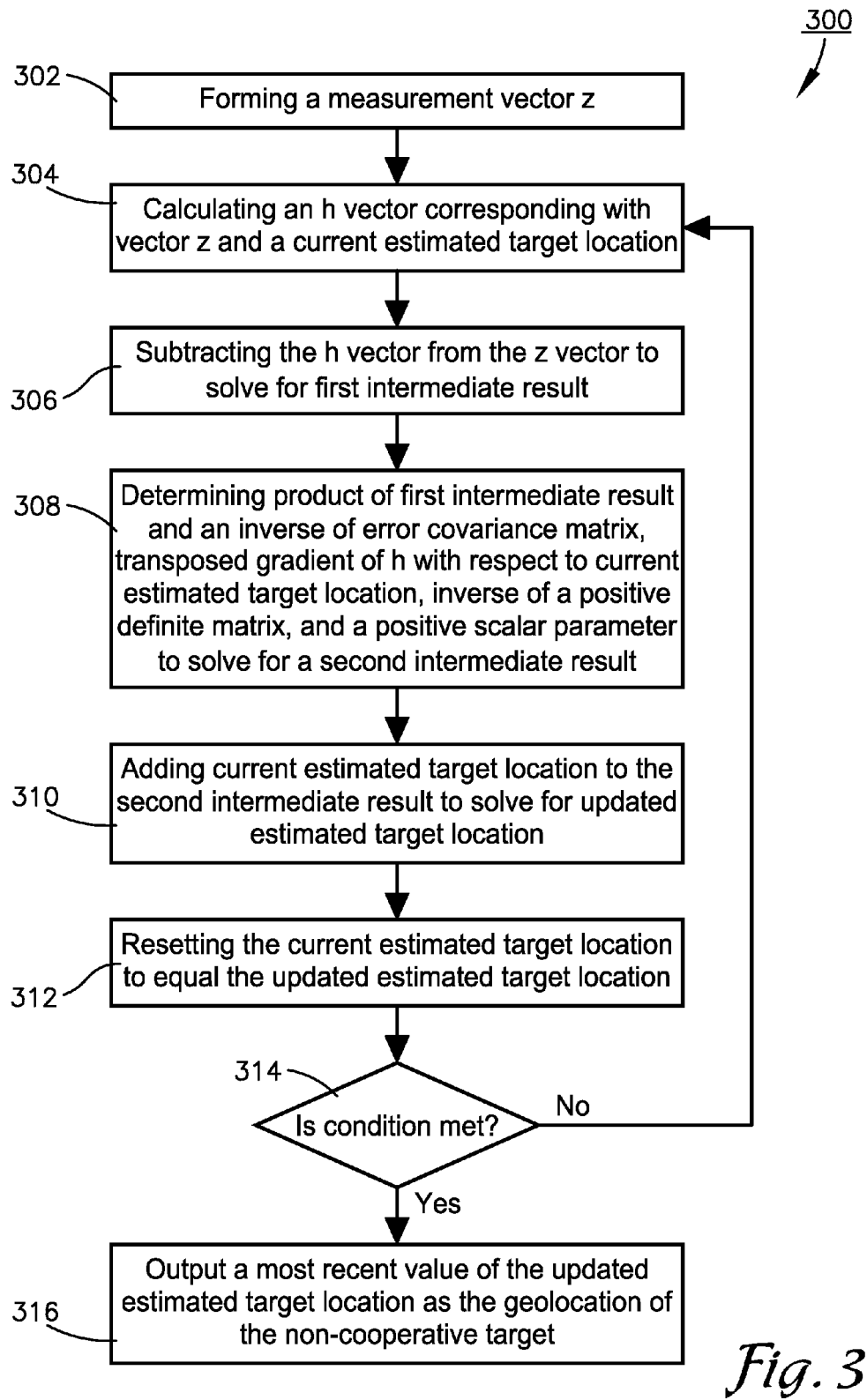
FIG. 3 is a flow chart of a method of determining the target using the a Levenberg-Marquardt algorithm according to an embodiment of the invention.

The flow charts of FIGS. 2 and 3 depict the steps of exemplary methods of the invention in more detail. In this regard, some of the blocks of the flow charts may represent a module segment or portion of code of the computer programs stored in or accessible by the processor. In some alternative implementations, the functions noted in the various blocks may occur out of the order depicted in FIGS. 2-3. For example, two blocks shown in succession in FIGS. 2-3 may in fact be executed substantially concurrently, or the blocks may some- FIG. 2 illustrates a method 200 in accordance with an exemplary embodiment of the invention. As depicted in step 202, actual signal measurements from the target 12 may be acquired. For example, the collectors 14, 16 may acquire the actual signals and may calculate or determine a plurality of actual signal measurements to output to the processing device 18. The processing device 18 may receive the actual signal measurements, as well as navigational data corresponding with the collectors 14, 16, as depicted in step 204. For example, the processing device 18 may receive DOA, range, TDOA, range rate, range sum, and/or FDOA. Additionally, the collectors 14, 16 may output navigational data to be received by the processing device 18, such as present coordinates, headings, and velocity information.

Next, the actual signal measurement and navigational data may be processed using a globally convergent algorithm to calculate the estimated target location, as depicted in step 206. An example of how the processing device 18 may use the Levenberg-Marquardt algorithm to calculate the estimated target location is mathematically described below. Once particular stop criteria is reached by the processing device 18, the most recent solution of the globally-convergent algorithm may be output as the estimated target location to the display 32 and/or another electronic device or processor, as depicted in step 208.

FIG. 3 illustrates a method 300 of calculating the estimated target location based on the actual signal measurements, statistically-known error, and navigational data. First, a measurement vector z comprising the actual signal measurements arranged in any order may be formed, as depicted in step 302. Then an h vector corresponding with the vector z and a current estimated target location may be calculated, as depicted in step 304. As described above, the h vector may comprise values corresponding with what each value of the measurement vector z would theoretically equal if the signal was emitted from the current estimated target location, assuming no error. The h vector may be subtracted from the z vector to solve for the first intermediate result, as depicted in step 306.

Next, the second intermediate result may be calculated by determining the product of the first intermediate result, an inverse of the measurement error covariance matrix corresponding to the measurement vector z, a transposed gradient of h evaluated at the current assumed target location, an inverse of a positive definite matrix $M_k$, and a positive scalar parameter $\alpha_k$, as depicted in step 308. Matrix $M_k$ may be determined by the processing device 18 or otherwise provided to the Levenberg-Marquardt module 20. The matrix $M_k$ may be at least one of a Hessian matrix and an augmented Hessian matrix of h, such that if the Hessian matrix is not positive definite, then the Levenberg-Marquardt module 20 is configured to add a positive scalar multiple of an identity matrix to the Hessian matrix so that the sum is positive definite. The Levenberg-Marquardt module 20 may also be configured to use a backtracking line search that determines the positive scalar parameter $\alpha_k$ such that a minimum variance optimization function g evaluated at the updated estimated target location is less than the function g evaluated at the current estimated target location. These operations are mathematically described in detail below.

The current estimated target location may be added to the second intermediate result to solve for the updated estimated target location, as depicted in step 310. The current estimated target location may then be reset to a value equaling the updated estimated target location, as depicted in step 312. The processing device may then determine if a particular condition has been met, as depicted in step 314. In some embodiments of the invention, the resetting of the current estimated target location may occur if and only if the condition is not met. The condition to be met may, for example, correspond with an amount of change between the current estimated target location and the updated estimated target location after each iteration, or the condition to be met may depend on a number of iterations completed, in which case a hardware or software counter may update after each updated estimated target location is solved for.

Once the condition is met, the most recent solution for the updated estimated target location may be output as the estimated target location and/or as the geolocation of the non-cooperative target, as depicted in step 316. For example, once a particular number of iterations are clocked by the counter, the updated estimated target location, or alternatively the current estimated target location, may be output to the display 32 to be viewed by a user. In another embodiment of the invention, the updated or current estimated target location may be output to another processing device or another module within the processing device 18 such that the value may be used in subsequent calculations or by subsequent software or hardware applications.

Mathematic Description of Problem and Solution:

The following sections describe mathematical equations, each of which may or may not be used by the processing device 18. These mathematical equations may be implemented by the processing device 18 via hardware components, software components, or a combination thereof. The equations described herein are merely examples. It is noted that equivalents may be employed and substitutions made herein without departing from the scope of the invention as recited in the claims.

Geo-location Problem Formulation:

Let $\psi$ and $\theta$ represent the target's WGS84 longitude and geodetic latitude, respectively. The 2×1 parameter vector (target location) to be estimated is:

$$q = \begin{bmatrix} \psi \\ \theta \end{bmatrix} \quad (1)$$

Let p represent the target's position relative to the earth in the Earth Centered Earth Fixed (ECEF) coordinate frame. Then:

$$p = p(q) = \begin{bmatrix} (r_E + a)\cos(\psi)\cos(\theta) \\ (r_E + a)\sin(\psi)\cos(\theta) \\ (r_E(1 - \varepsilon^2) + a)\sin(\theta) \end{bmatrix} \quad (2)$$

Where $\alpha$ is the (known) target altitude, $\epsilon \approx 0.08181919$ is the earth's eccentricity, $r_E$ is the earth's transverse radius of curvature defined by:

$$r_E = r_{eq}(1 - \epsilon^2 \sin^2(\theta))^{-1/2} \quad (3)$$

and $r_{eq}$=6378137 is the earth's equatorial radius in meters.

Let z be an n×1 vector of sensor measurements to be processed for geo-location. Each component of z may be a measurement of DOA, range, TDOA, range rate, range sum, or FDOA. Let h(q): $\Re^2 \rightarrow \Re^n$ be a function that gives the true value of the quantities being measured, which are included in vector z. In other words, h may represent an h vector comprising true and/or calculated values of what various measurements theoretically should be when the target is located at q. The z vector comprises the actual measured values, which are affected by error as described below.

$$z = h(q) + \epsilon \quad (4)$$

where $\epsilon$ is an n×1 vector of measurement errors. In various embodiments of the invention, it may be assumed that the measurement errors are Gaussian, zero-mean, and uncorrelated. As a result:

$$\epsilon \sim N(0, R) \quad (5)$$

where R is an n×n diagonal positive definite measurement error covariance matrix having the following form:

$$R = \begin{bmatrix} \sigma_1^2 & 0 & \cdots & 0 \\ 0 & \sigma_2^2 & \ddots & \vdots \\ \vdots & \ddots & \ddots & 0 \\ 0 & \cdots & 0 & \sigma_n^2 \end{bmatrix} \quad (6)$$

The objective function to be minimized is the scalar:

$$g(q) = (z - h(q))^T R^{-1} (z - h(q)) = \sum_{i=1}^{n} \left(\frac{1}{\sigma_i^2}\right)(z_i - h_i(q))^2 \quad (7)$$

Because the measurement errors may be assumed to be Gaussian, minimization of the above objective function may give the Maximum Likelihood Estimate (MLE) of q:

$$\hat{q} = \arg\min_{q} g(q) \quad (8)$$

The MLE of q may be used as an estimated or approximate coordinate of the target.

Gradients and Hessians:

The gradient and Hessian of the objective function shown in Equation 7 may be required by the algorithms described herein and may be calculated by the processing device 18. Differentiating Equation 7 gives the 1×2 row vector that is the derivative of the objective function:

$$\frac{\partial g}{\partial q} = -2(z - h(q))^T R^{-1}\left(\frac{\partial h}{\partial q}\right) = -2\sum_{i=1}^{n}\left(\frac{1}{\sigma_i^2}\right)(z_i - h_i(q))\left(\frac{\partial h_i}{\partial q}\right) \quad (9)$$

The gradient of g is then the 2×1 column vector $$\left(\frac{\partial g}{\partial q}\right)^T.$$

The Hessian of g is the 2×2 symmetric matrix of second derivatives given by:

$$\frac{\partial^2 g}{\partial q^2} = -2\sum_{i=1}^{n}\left(\frac{1}{\sigma_i^2}\right)\left((z_i - h_i(q))\left(\frac{\partial^2 h_i}{\partial q^2}\right) - \left(\frac{\partial h_i}{\partial q}\right)^T\left(\frac{\partial h_i}{\partial q}\right)\right) \quad (10)$$

The measurement function h may be expressed in terms of target ECEF position p instead of WGS84 coordinates q, with the derivatives of the measurement function computed using:

$$\frac{\partial h_i}{\partial q} = \left(\frac{\partial h_i}{\partial p}\right)\left(\frac{\partial p}{\partial q}\right) \quad (11)$$

and $$\frac{\partial^2 h_i}{\partial q^2} = \left(\frac{\partial}{\partial q}\left(\frac{\partial h_i}{\partial p}\right)\right)\left(\frac{\partial p}{\partial q}\right) + \quad (12)$$

$$\begin{bmatrix} \left(\frac{\partial h_i}{\partial p}\right)\left(\frac{\partial^2 p}{\partial \psi^2}\right) & \left(\frac{\partial h_i}{\partial p}\right)\left(\frac{\partial^2 p}{\partial \psi \partial \theta}\right) \\ \left(\frac{\partial h_i}{\partial p}\right)\left(\frac{\partial^2 p}{\partial \psi \partial \theta}\right) & \left(\frac{\partial h_i}{\partial p}\right)\left(\frac{\partial^2 p}{\partial \theta^2}\right) \end{bmatrix}$$

$$= \left(\left(\frac{\partial}{\partial q}\left(\frac{\partial h_i}{\partial p}\right)\right)\left(\frac{\partial p}{\partial q}\right)\right)^T\left(\frac{\partial p}{\partial q}\right) +$$

$$\begin{bmatrix} \left(\frac{\partial h_i}{\partial p}\right)\left(\frac{\partial^2 p}{\partial \psi^2}\right) & \left(\frac{\partial h_i}{\partial p}\right)\left(\frac{\partial^2 p}{\partial \psi \partial \theta}\right) \\ \left(\frac{\partial h_i}{\partial p}\right)\left(\frac{\partial^2 p}{\partial \psi \partial \theta}\right) & \left(\frac{\partial h_i}{\partial p}\right)\left(\frac{\partial^2 p}{\partial \theta^2}\right) \end{bmatrix}$$

$$= \left(\frac{\partial p}{\partial q}\right)^T\left(\frac{\partial^2 h_i}{\partial p^2}\right)\left(\frac{\partial p}{\partial q}\right) +$$

$$\begin{bmatrix} \left(\frac{\partial h_i}{\partial p}\right)\left(\frac{\partial^2 p}{\partial \psi^2}\right) & \left(\frac{\partial h_i}{\partial p}\right)\left(\frac{\partial^2 p}{\partial \psi \partial \theta}\right) \\ \left(\frac{\partial h_i}{\partial p}\right)\left(\frac{\partial^2 p}{\partial \psi \partial \theta}\right) & \left(\frac{\partial h_i}{\partial p}\right)\left(\frac{\partial^2 p}{\partial \theta^2}\right) \end{bmatrix}$$

The terms $$\frac{\partial h_i}{\partial p} \text{ and } \frac{\partial^2 h_i}{\partial p^2}$$

used above may be unique to each measurement type and are derived below for the measurement types described herein. The remaining terms of Equation 12 may be the same regardless of the measurement type and are derived in Equations 13-30 below.

WGS84 Coordinates:

To simplify the differentiation of Equation 2, coordinate p may be expressed as follows:

$$p = au + r_E v \quad (13)$$

where $$u = \begin{bmatrix} \cos(\psi)\cos(\theta) \\ \sin(\psi)\cos(\theta) \\ \sin(\theta) \end{bmatrix} \quad (14)$$

and $$v = \begin{bmatrix} \cos(\psi)\cos(\theta) \\ \sin(\psi)\cos(\theta) \\ (1 - \varepsilon^2)\sin(\theta) \end{bmatrix} \quad (15)$$

The first derivatives are:

$$\frac{\partial p}{\partial q} = \begin{bmatrix} \frac{\partial p}{\partial \psi} & \frac{\partial p}{\partial \theta} \end{bmatrix} \quad (16)$$

Using Equations 3 and 13-15 may give:

$$\frac{\partial p}{\partial \psi} = a\left(\frac{\partial u}{\partial \psi}\right) + r_E\left(\frac{\partial v}{\partial \psi}\right) \tag{17}$$

$$\frac{\partial p}{\partial \theta} = a\left(\frac{\partial u}{\partial \theta}\right) + r_E\left(\frac{\partial v}{\partial \theta}\right) + \left(\frac{\partial r_E}{\partial \theta}\right)v \tag{18}$$

where $$\frac{\partial u}{\partial \psi} = \frac{\partial v}{\partial \psi} = \begin{bmatrix} -\sin(\psi)\cos(\theta) \\ \cos(\psi)\cos(\theta) \\ 0 \end{bmatrix} \tag{19}$$

$$\frac{\partial u}{\partial \theta} = \begin{bmatrix} -\cos(\psi)\sin(\theta) \\ -\sin(\psi)\sin(\theta) \\ \cos(\theta) \end{bmatrix} \tag{20}$$

$$\frac{\partial v}{\partial \theta} = \begin{bmatrix} -\cos(\psi)\sin(\theta) \\ -\sin(\psi)\sin(\theta) \\ (1-\varepsilon^2)\cos(\theta) \end{bmatrix} \tag{21}$$

$$\frac{\partial r_E}{\partial \theta} = r_{eq}\varepsilon^2 \sin(\theta)\cos(\theta)(1-\varepsilon^2\sin^2(\theta))^{-3/2} \tag{22}$$

The second derivatives may be computed by differentiating Equations 17 and 18.

$$\frac{\partial^2 p}{\partial \psi^2} = a\left(\frac{\partial^2 u}{\partial \psi^2}\right) + r_E\left(\frac{\partial^2 v}{\partial \psi^2}\right) \tag{23}$$

$$\frac{\partial^2 p}{\partial \psi \partial \theta} = a\left(\frac{\partial^2 u}{\partial \psi \partial \theta}\right) + r_E\left(\frac{\partial^2 v}{\partial \psi \partial \theta}\right) + \left(\frac{\partial r_E}{\partial \theta}\right)\left(\frac{\partial v}{\partial \psi}\right) \tag{24}$$

$$\frac{\partial^2 p}{\partial \theta^2} = a\left(\frac{\partial^2 u}{\partial \theta^2}\right) + r_E\left(\frac{\partial^2 v}{\partial \theta^2}\right) + 2\left(\frac{\partial r_E}{\partial \theta}\right)\left(\frac{\partial v}{\partial \theta}\right) + \left(\frac{\partial^2 r_E}{\partial \theta^2}\right)v \tag{25}$$

where from Equations 19-22 we have:

$$\frac{\partial^2 u}{\partial \psi^2} = \frac{\partial^2 v}{\partial \psi^2} = \begin{bmatrix} -\cos(\psi)\cos(\theta) \\ -\sin(\psi)\cos(\theta) \\ 0 \end{bmatrix} \tag{26}$$

$$\frac{\partial^2 u}{\partial \psi \partial \theta} = \frac{\partial^2 v}{\partial \psi \partial \theta} = \begin{bmatrix} \sin(\psi)\cos(\theta) \\ -\cos(\psi)\cos(\theta) \\ 0 \end{bmatrix} \tag{27}$$

$$\frac{\partial^2 u}{\partial \theta^2} = \begin{bmatrix} -\cos(\psi)\sin(\theta) \\ -\sin(\psi)\sin(\theta) \\ -\sin(\theta) \end{bmatrix} \tag{28}$$

$$\frac{\partial^2 v}{\partial \theta^2} = \begin{bmatrix} -\cos(\psi)\cos(\theta) \\ -\sin(\psi)\cos(\theta) \\ -(1-\varepsilon^2)\sin(\theta) \end{bmatrix} \tag{29}$$

$$\frac{\partial^2 r_E}{\partial \theta^2} = r_{eq}\varepsilon^2(1 - 2\sin^2(\theta) + 2\varepsilon^2\sin^2(\theta) - \varepsilon^2\sin^4(\theta))(1-\varepsilon^2\sin^2(\theta))^{-2} \tag{30}$$

Calculating Vector h Values:

In order to determine the terms $$\frac{\partial h_i}{\partial p} \text{ and } \frac{\partial^2 h_i}{\partial p^2},$$

equations for calculating values of the h vector be formulated based on the corresponding type of signal measurement in vector z. For example, if a first value in vector z is a range difference measurement, then an equation for finding the first value in the h vector will solve for range difference based on a position s of one of the collectors 14, 16 and a position p (or an assumed or estimated position p) of the target 12.

The following equations describe how to solve for values of the h vector for each of the following measurement types: DOA, target range, TDOA, range rate, range sum, and FDOA. Certain navigational data regarding one or more of the collectors 14, 16, such as location s and velocity $\dot{s}$ may be required. Using the h vector equations for each measurement type, the first and second derivatives, terms $$\frac{\partial h_i}{\partial p} \text{ and } \frac{\partial^2 h_i}{\partial p^2},$$

are also derived below and may be used by one or more of the optimization algorithms later described herein. Note that since TDOA is equivalent to a range difference and FDOA is equivalent to a range rate difference, the derivatives for range and rate are provided herein. If, for example, the measurement is of TDOA, then the derivatives for range are computed for each of the two sensors or collectors involved and subtracted to compute the derivatives needed for the TDOA measurement. Likewise, if the measurement is of range sum, then the derivatives are added.

Figure 4:
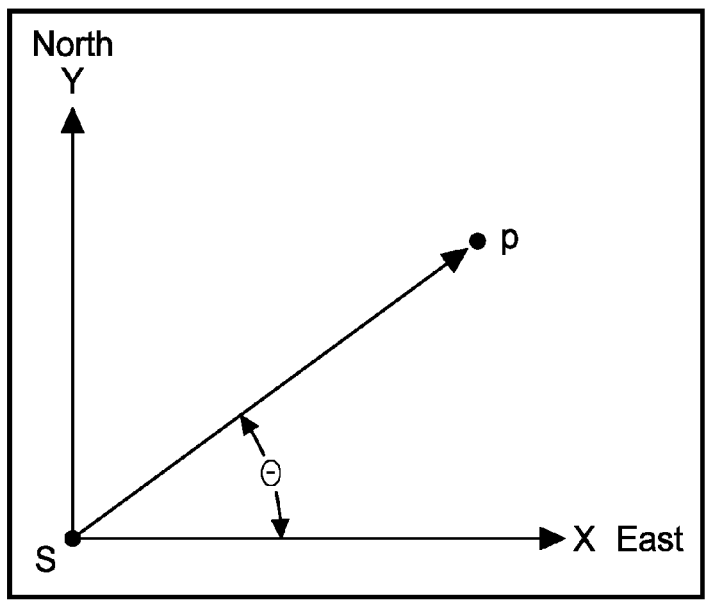
FIG. 4 is a graph illustrating variables used in determining a direction of arrival (DOA) measurement.

Direction of Arrival (DOA) Measurements:

FIG. 4 illustrates a situation where measurement i is of DOA defined relative to an East-North-Up (ENU) coordinate frame at the collector. The vector may be defined as follows:

$$d = TLE \cdot (p - s) \equiv \begin{bmatrix} x \\ y \\ z \end{bmatrix} \tag{31}$$

where TLE is the rotation matrix relating the ECEF coordinate frame E and the local ENU coordinate frame L. Then the measurement function h may be:

$$h_i(p) = \theta = \tan^{-1}\left(\frac{y}{x}\right) \tag{32}$$

The first derivative may be computed using Equations 31 and 32 and a chain rule for differentiation:

$$\frac{\partial h_i}{\partial p} = \frac{\partial h_i}{\partial d}\frac{\partial d}{\partial p} \tag{33}$$

where $$\frac{\partial h_i}{\partial d} = \frac{1}{x^2 + y^2}[-y \quad x \quad 0] \tag{34}$$

$$\frac{\partial d}{\partial p} = TLE \tag{35}$$

The second derivative is computed by applying the chain rule to Equation 33.

$$\frac{\partial^2 h_i}{\partial p^2} = \frac{\partial}{\partial p}\left(\left(\frac{\partial h_i}{\partial d}\right)\left(\frac{\partial d}{\partial p}\right)\right) \quad (36)$$

$$= \left(\frac{\partial}{\partial p}\left(\frac{\partial h_i}{\partial d}\right)\right)\left(\frac{\partial d}{\partial p}\right) + \left(\frac{\partial^2 d}{\partial p^2}\right)\left(\frac{\partial h_i}{\partial d}\right)^T$$

$$= \left(\frac{\partial}{\partial p}\left(\frac{\partial h_i}{\partial d}\right)\right)\left(\frac{\partial d}{\partial p}\right)$$

since $$\frac{\partial^2 d}{\partial p^2} = 0.$$

Continuing from Equation 36, $$\frac{\partial^2 h_i}{\partial p^2} = \left(\left(\frac{\partial}{\partial d}\left(\frac{\partial h_i}{\partial d}\right)\right)\left(\frac{\partial d}{\partial p}\right)\right)^T\left(\frac{\partial d}{\partial p}\right) = \left(\frac{\partial d}{\partial p}\right)^T\left(\frac{\partial^2 h_i}{\partial d^2}\right)\left(\frac{\partial d}{\partial p}\right) \quad (37)$$

where $$\frac{\partial^2 h_i}{\partial d^2} = \frac{1}{(x^2+y^2)^2}\begin{bmatrix} 2xy & y^2-x^2 & 0 \\ y^2-x^2 & -2xy & 0 \\ 0 & 0 & 0 \end{bmatrix} \quad (38)$$

Range Measurement:

If measurement i is of range, then the measurement function may be:

$$h_i(p) = r = \|p-s\| = ((p-s)^T(p-s))^{1/2} \quad (39)$$

The first derivative is:

$$\frac{\partial h_i}{\partial p} = \frac{1}{2}((p-s)^T(p-s))^{-1/2} \cdot 2(p-s)^T = \frac{1}{r}(p-s)^T = u^T \quad (40)$$

where u is a unit vector directed from the collector or sensor towards the target in the ECEF coordinate frame.

The second derivative is:

$$\frac{\partial^2 h_i}{\partial p^2} = \frac{1}{r}(I - uu^T) \quad (41)$$

Range Rate Measurement:

If measurement i is of range rate, then the measurement function is:

$$h_i(p) = \dot{r} = -\dot{s}^T u \quad (42)$$

where u was defined in Equation 40. The first derivative may be computed using Equations 40 and 41:

$$\frac{\partial h_i}{\partial p} = -\dot{s}^T\left(\frac{\partial u}{\partial p}\right) = -\frac{1}{r}\dot{s}^T(I - uu^T) \quad (43)$$

The second derivative can be computed by applying the chain rule to Equation 43:

$$\frac{\partial^2 h_i}{\partial p^2} = -\left(\frac{\partial(1/r)}{\partial p}\right)^T \dot{s}^T(I - uu^T) + \frac{1}{r}\left(\frac{\partial(\dot{s}^T uu^T)}{\partial p}\right) \quad (44)$$

$$= \frac{1}{r^2}((u\dot{s}^T)(I - uu^T) + (I - uu^T)(\dot{s}u^T) + (\dot{s}^T u)(I - uu^T))$$

Optimization Algorithms:

The Levenberg-Marquardt algorithm is a globally-convergent algorithm, may be used by the processing device herein to approximate the target location coordinates, and is based on modifications to an Iterated Least-Squares algorithm, which is in turn based on Newton's Method, as described below. Newton's Method is one method for determining an approximation or estimate $\hat{q}$ of the target's true WGS84 coordinates q. A truncated Taylor Series expansion about $\hat{q}$ gives:

$$g(q) \cong g(\hat{q}) + \left(\frac{\partial g}{\partial q}(\hat{q})\right)(q - \hat{q}) + \frac{1}{2}(q - \hat{q})^T\left(\frac{\partial^2 g}{\partial q^2}(\hat{q})\right)(q - \hat{q}) \quad (45)$$

Differentiating Equation 45 and using the fact that the gradient is zero at q gives:

$$0 \cong \left(\frac{\partial g}{\partial q}(\hat{q})\right)^T + \left(\frac{\partial^2 g}{\partial q^2}(\hat{q})\right)(q - \hat{q}) \quad (46)$$

and therefore:

$$q \cong \hat{q} - \left(\frac{\partial^2 g}{\partial q^2}(\hat{q})\right)^{-1}\left(\frac{\partial g}{\partial q}(\hat{q})\right)^T \quad (47)$$

The above equation is used to create the following recursive relationship for estimates $\hat{q}$ of the target coordinates q. Therefore, Newton's Method may be expressed as Equation 48, below.

$$\hat{q}_{k+1} = \hat{q}_k - \left(\frac{\partial^2 g}{\partial q^2}(\hat{q}_k)\right)^{-1}\left(\frac{\partial g}{\partial q}(\hat{q}_k)\right)^T \quad (48)$$

When g is globally convex, Newton's Method provides fast convergence from any initial location estimate. However, if g is not globally convex, then there will be points where the Hessian is singular as well as points where the above iteration moves the location estimate away from the solution.

There are several disadvantages associated with Newton's Method as described above. First, the Hessian required in Equation 48 and defined in equation 10 may be complex and difficult to compute, primarily because of the second derivative terms $$\frac{\partial^2 h_i}{\partial q^2}.$$

Additionally, the terms $$(z_i - h_i(\hat{q}))\left(\frac{\partial^2 h_i}{\partial q^2}(\hat{q})\right)$$

may cause the Hessian of g to not be convex due to the measurement errors in $z_i$. When $\hat{q}$ is far from q, this term is large and most likely to prevent convexity. When $\hat{q}$ is close to q, this term is small and can be neglected.

For these reasons, the Itterated Least-Squares algorithm neglects the second derivative terms and uses the following approximation of the Hessian, which is always at least positive semidefinte.

$$\frac{\partial^2 g}{\partial q^2} \cong 2\sum_{i=1}^{n}\left(\frac{1}{\sigma_i^2}\right)\left(\frac{\partial h_i}{\partial q}\right)^T\left(\frac{\partial h_i}{\partial q}\right) = 2\left(\frac{\partial h}{\partial q}\right)^T R^{-1}\left(\frac{\partial h}{\partial q}\right) \quad (49)$$

Substituting Equations 9 and 49 into Equation 48 gives a simplification of Newton's Method: the Iterated Least-Squares algorithm expressed in Equation 50 below.

$$\hat{q}_{k+1} = \hat{q}_k + \left(\left(\frac{\partial h}{\partial q}(\hat{q}_k)\right)^T R^{-1}\left(\frac{\partial h}{\partial q}(\hat{q}_k)\right)\right)^{-1}\left(\frac{\partial h}{\partial q}(\hat{q}_k)\right)^T R^{-1}(z - h(\hat{q}_k)) \quad (50)$$

The Iterated Least-Squares algorithm provides simplicity and stability by removing the second derivative terms from the Hessian. However, poor initialization of a first estimated coordinate $\hat{q}_0$ can result in erratic behavior and convergence to distant locations relative to the actual target coordinates q.

Thus, a modification of the Iterated Least-Squares algorithm resulting in the Levenberg-Marquardt algorithm may ensure global convergence of the objective function. The equations for deriving the Levenberg-Marquardt algorithm as used in one embodiment of the processing described herein are explained below.

In one embodiment of the invention, it may be supposed that two successive estimates of the actual target coordinates q are relate by:

$$\hat{q}_{k+1} = \hat{q}_k + \alpha d \quad (51)$$

where $\alpha$ is a positive scalar parameter and d is a 2×1 direction vector. Define the following scalar valued function:

$$f(\alpha) = g(\hat{q}_k + \alpha d) \quad (52)$$

where g is the objective function defined in Equation 7. Assuming that g is differentiable at $\hat{q}_k$, then:

$$f'(0) = \left(\frac{\partial g}{\partial q}(\hat{q}_k + \alpha d)\right)\left(\frac{\partial(\hat{q}_k + \alpha d)}{\partial \alpha}\right)\bigg|_{\alpha=0} = \left(\frac{\partial g}{\partial q}(\hat{q}_k)\right)d \quad (53)$$

Additionally, it may be supposed that:

$$d = -M_k^{-1}\left(\frac{\partial g}{\partial q}(\hat{q}_k)\right)^T \quad (54)$$

where $M_k$ is any 2×2 positive definite matrix. Substituting Equation 54 into Equation 53 gives:

$$f'(0) = -\left(\frac{\partial g}{\partial q}(\hat{q}_k)\right)M_k^{-1}\left(\frac{\partial g}{\partial q}(\hat{q}_k)\right)^T < 0 \quad (55)$$

Since g is differentiable at $\hat{q}_k$, f is differentiable at $\alpha$. As a result, there is a positive value of $\alpha$ small enough, say $\alpha_k$, such that:

$$f'(\alpha_k) < 0 \quad (56)$$

Combining Equation 51 and Equation 54 may give the associated parameter update as:

$$\hat{q}_{k+1} = \hat{q}_k - \alpha_k M_k^{-1}\left(\frac{\partial g}{\partial q}(\hat{q}_k)\right)^T \quad (57)$$

From Equation 56, it may be known that f is decreasing at $\alpha_k$, and therefore:

$$f(\alpha_k) < f(0) \quad (58)$$

Therefore, combining Equations 51, 52, 57, and 58 may give:

$$g(\hat{q}_{k+1}) = g\left(\hat{q}_k - \alpha_k M_k^{-1}\left(\frac{\partial g}{\partial q}(\hat{q}_k)\right)^T\right) < g(\hat{q}_k) \quad (59)$$

To summarize, at each update or subsequent iteration a "descent direction" is given by the product of any positive definite matrix and the gradient of the objective function, in that the objective function can be decreased by changing the parameter estimate along this direction. The Levenberg-Marquardt algorithm is presented herein as a modification of the Iterated Least-Squares algorithm given in equation 50, with the modification ensuring that a descent direction is used at each update or subsequent iteration. The Levenberg-Marquardt algorithm may be expressed by combining the parameter update of Equation 57 with the Iterated Least-Squares algorithm of Equation 50:

$$\hat{q}_{k+1} = \hat{q}_k + \alpha_k M_k^{-1}\left(\frac{\partial h}{\partial q}(\hat{q}_k)\right)^T R^{-1}(z - h(\hat{q}_k)) \quad (60)$$

So each current estimated target location $\hat{q}_k$ may be used to solve for each updated estimated target location $\hat{q}_{k+1}$ then the current estimated target location may be reset to equal the updated estimated target location and may be substituted into Equation 60 to solve for yet another updated estimated target location. This process may continue until a particular stopping criteria is met, as further described below. Once the stopping criteria is met, the most recent updated estimated target location may be designated as the estimate to output to a user or another processing device.

Other implementations of the Levenberg-Marquardt algorithm may be used by the processing device 18 described herein without departing from the scope of the invention. However, various embodiment of the invention may use methods described below to construct the positive definite matrix $M_k$ and to determine a value for the parameter $\alpha_k$.

Hessian Matrix Augmentation:

The matrix $M_k$ used in Equation 60 may be constructed as shown below.

$$M_k = A_k + \beta_k I \quad (60)$$

where $\beta_k$ is a positive scalar parameter, I is the 2×2 identity matrix, and $$A_k \equiv \left(\frac{\partial h}{\partial q}(\hat{q}_k)\right)^T R^{-1}\left(\frac{\partial h}{\partial q}(\hat{q}_k)\right) \tag{62}$$

is the Hessian matrix used in Equation 50. The above matrix is referred to herein as the "Hessian" for simplicity, however a review of Equations 10 and 49 shows that it is actually ½ of the approximation used for the Iterated Least-Squares algorithm.

Note that when $\beta_k=0$ the Hessian is that used by the Iterated Least-Squares algorithm, and when $\beta_k$ is very large, the Hessian is approximately $\beta_k I$ and the method is equivalent to Steepest Descent, which is a method also known as Gradient Descent. Let $\lambda_{max}$ and $\lambda_{min}$ be the eigenvalues of $A_k$. Let $\delta > 0$ be the minimum desired eigenvalue of $M_k$. Then the parameter $\beta_k$ may be computed as:

$$\beta_k = \begin{cases} 0; & \lambda_{min} \geq \delta \\ \delta - \lambda_{min}; & \lambda_{min} < \delta \end{cases} \tag{63}$$

It can be shown that the above augmentation of the matrix $A_k$ gives the matrix closest to $A_k$ in the Euclidean sense, among all matrices with eigenvalues $\geq \delta$; i.e., $$M_k = \arg \min_{\substack{C \\ eig(C) \geq \delta}} \|C - A_k\|_2 \tag{64}$$

Line Search:

Once the Hessian matrix has been augmented to produce the positive definite matrix $M_k$, a positive value parameter $\alpha_k$ exists such that the update in Equation 60 will satisfy the condition of Equation 59 ($g(\hat{q}_{k+1}) < g(\hat{q}_k)$). Numerous methods for choosing the parameter $\alpha_k$ are known and vary from very simple to very complex. The method described herein, as used in various embodiments of the invention, is a "backtracking" line search. Remember that the parameter vector q being estimated consists of the target's WGS84 longitude and geodetic latitude, as given in Equation 1. Using Equation 60, the step size between parameter updates, in radians, may be determined by:

$$\|\hat{q}_{k+1} - \hat{q}_k\| = \alpha_k \left\| M_k^{-1}\left(\frac{\partial h}{\partial q}(\hat{q}_k)\right)^T R^{-1}(z - h(\hat{q}_k)) \right\| \tag{65}$$

For example, suppose that the desired maximum step size for each update is 1 nautical mile. Then an equivalent bound in radians is approximately:

$$\alpha_k \left\| M_k^{-1}\left(\frac{\partial h}{\partial q}(\hat{q}_k)\right)^T R^{-1}(z - h(\hat{q}_k)) \right\| \leq \frac{1852}{r_{eq}} = \tag{66}$$

$$\frac{1852}{6378137} \cong 2.9037 \times 10^{-4}$$

where $r_{eq}$ is the earth's equatorial radius introduced in Equation 3. The following bound may then apply to the values of $\alpha_k$:

$$\alpha_k \leq \alpha_{max} \equiv \frac{2.9037 \times 10^{-4}}{\left\| M_k^{-1}\left(\frac{\partial h}{\partial q}(\hat{q}_k)\right)^T R^{-1}(z - h(\hat{q}_k)) \right\|} \tag{67}$$

The backtracking line search may be implemented as follows. Set $\alpha_k = \alpha_{max}$ defined in Equation 67, compute $\hat{q}_{k+1}$ using Equation 60, then compute the objective function value $g(\hat{q}_{k+1})$. If $g(\hat{q}_{k+1}) < g(\hat{q}_k)$, then stop. Otherwise, set $$\alpha_k = \frac{\alpha_k}{2}.$$

This may be repeated until a value of $\alpha_k$ is found that decreases the objective function.

Stopping Criteria:

Iterative algorithms require stopping criteria to prevent the processing device from running the algorithm indefinitely. In other words, once the processing device 18 determines that a particular condition has been met, the iterative algorithm, such as the Levenberg-Marquardt algorithm, may stop, and the most recent updated estimated target location can be assigned to be the estimated target location to output to the user or another processing device. One possible stopping criterion may be a maximum allowed number of iterations, (i.e. k<1000).

Other criteria may attempt to stop iteration if additional updates would seem to provide little or no improvement in the updated estimated target location. For example, when $\|\hat{q}_{k+1} - \hat{q}_k\|$ and/or $$\left\|\frac{\partial g}{\partial q}(\hat{q}_k)\right\|$$

become sufficiently small, then little change in $\hat{q}_k$ may be expected in subsequent updates or iterations. In one embodiment of the invention, the processing device 18 may make a comparison of the current estimated target location and the updated estimated target location and may stop the iteration of the Levenberg-Marquardt algorithm if the comparison satisfies desired difference parameters or desired ratio parameters.

Additionally, a tolerance on change in ECEF position may be a stopping criterion. For example, let $\hat{p}_k$ be the ECEF position estimate associated with the parameter estimate $\hat{q}_k$. Then iteration is terminated if the distance between consecutive position estimates is less than, for example, 1 meter: $\|\hat{p}_{k+1} - \hat{p}_k\| < 1$ meter.

Simulation Example:

An example MATLAB® simulation of a geo-location scenario is described below to illustrate the robustness to errors in initial target location estimates of the Levenberg-Marquardt algorithm, as applied by the processing device described herein, compared to the Iterated Least-Squares algorithm. The example scenario involves an aircraft and an unmanned aerial vehicle (UAV) attempting to locate a communication signal source using only a single measurement of TDOA and a single measurement of FDOA. The example scenario parameters used in the simulation are provided in the following table:

TABLE 1

| | |
|---|---|
| Aircraft speed (knots) | 400 |
| Aircraft heading | west |
| Aircraft altitude (ft) | 30,000 |
| UAV speed (knots) | 120 |
| UAV heading | north |
| UAV altitude (ft) | 10,000 |
| Signal frequency (MHz) | 150 |
| Time measurement error sigma (ns) | 100 |
| Frequency measurement error sigma (Hz) | 0.3 |

Figure 5:
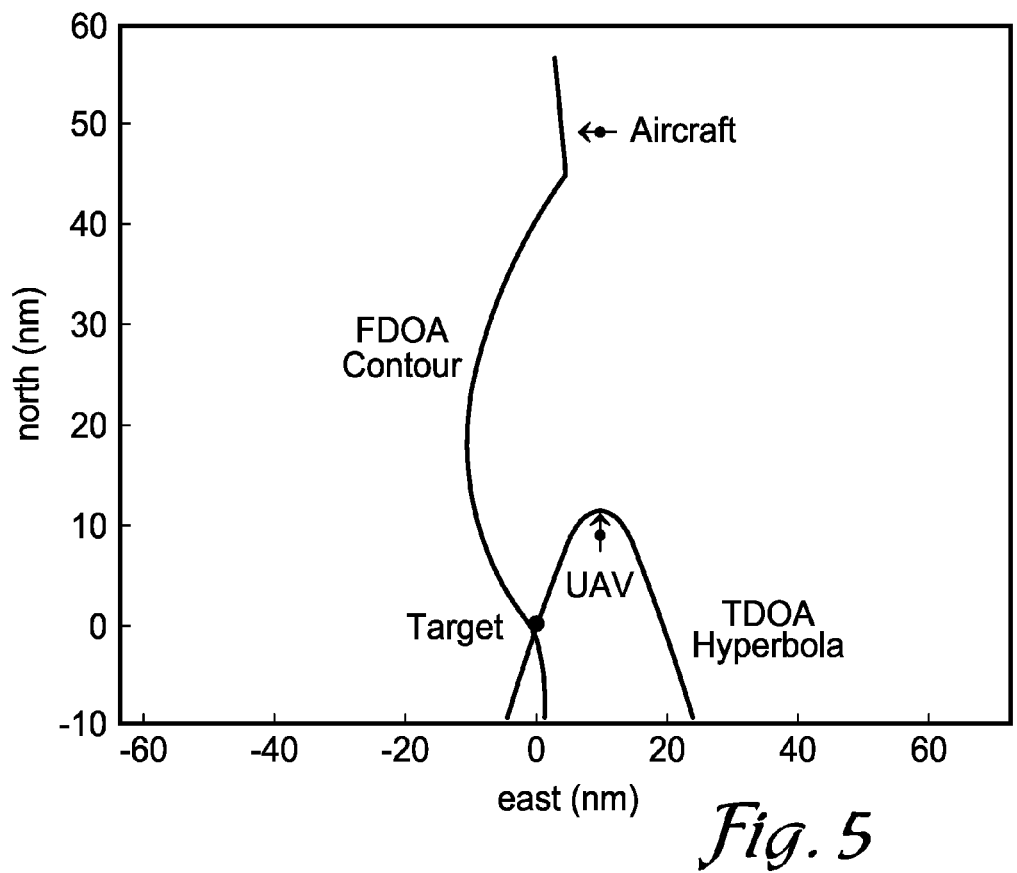
FIG. 5 is a graph illustrating an example scenario geometry and measurement isograms of a frequency difference of arrival (FDOA) and a time difference of arrival (TDOA)
Figure 6:
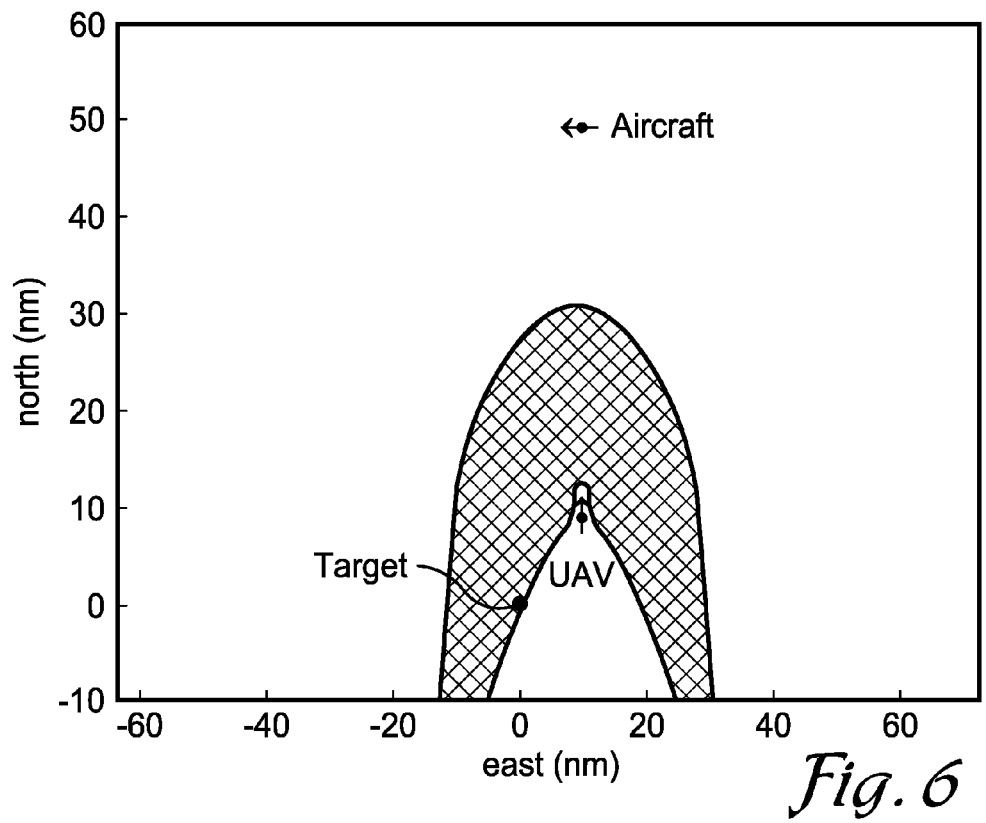
FIG. 6 is a graph illustrating the convexity of an objective function given in Equation 7 within the Detailed Description according to the example scenario of FIG. 5.
Figure 7:
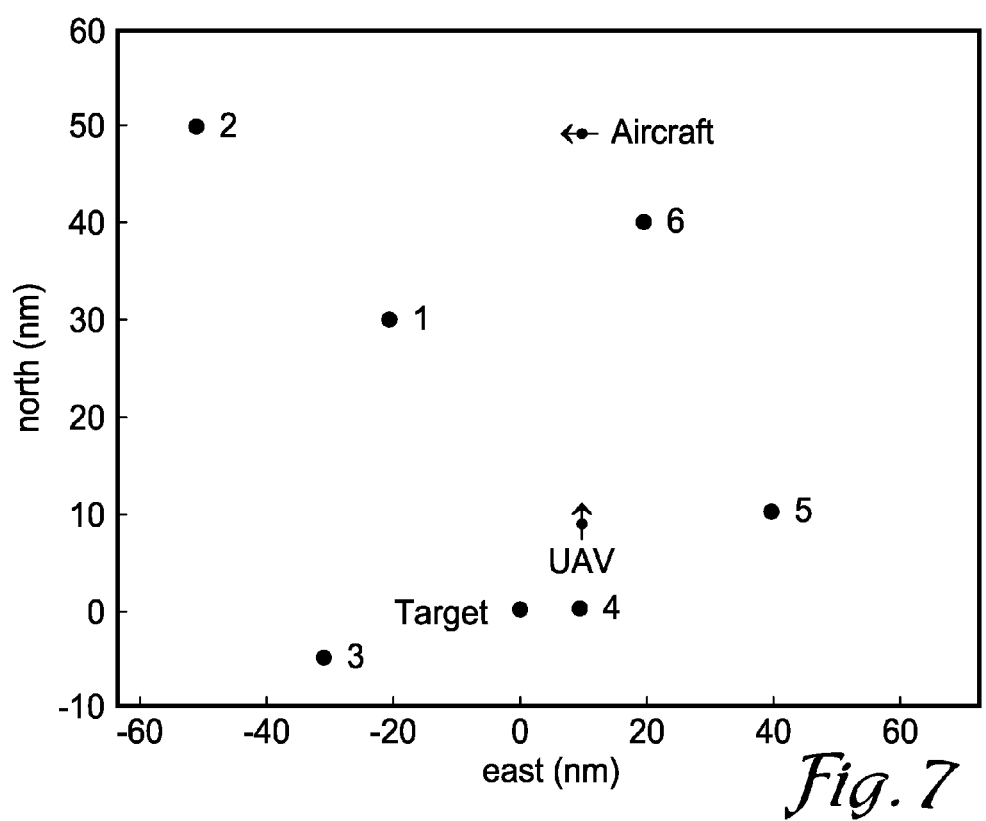
FIG. 7 is a graph illustrating a plurality of initial location estimates relative to the target according to the example scenario of FIG. 5.

Resulting geometry and measurement isograms for this example scenario are shown in FIG. 5. Convexity of the objective function given in Equation 7 above is illustrated in FIG. 6, where the shaded region indicates locations where the objective function is convex (i.e., the Hessian matrix given in Equation 10 is positive semidefinite). Since Newton's Method uses this Hessian matrix, initialization of Newton's Method outside of the shaded region would result in unpredictable performance. Because no measurement of DOA is available, choosing an accurate initial location estimate in this example is difficult. Six initial location estimates (1-6) are used in this example for both the Levenberg-Marquardt algorithm and the Iterated Least-Squares algorithm, and are shown in FIG. 7. Iterated Least-Squares converges when initializing at point 1, but diverges when initialized at points 2-6. The Levenberg-Marquardt algorithm converges when initialized at all six points.

The Levenberg-Marquardt parameters used in this example are provided in Table 2 below.

TABLE 2

| | |
|---|---|
| Minimum eigen value of Hessian: $\delta$ in Equation 63 | 0.001 |
| Maximum step size for line search (nm) | 1 |
| Stopping criteria: maximum allowed number of iterations | 1000 |
| Stopping criteria: distance between ECEF positions estimates (m) | 1 |

Figure 8:
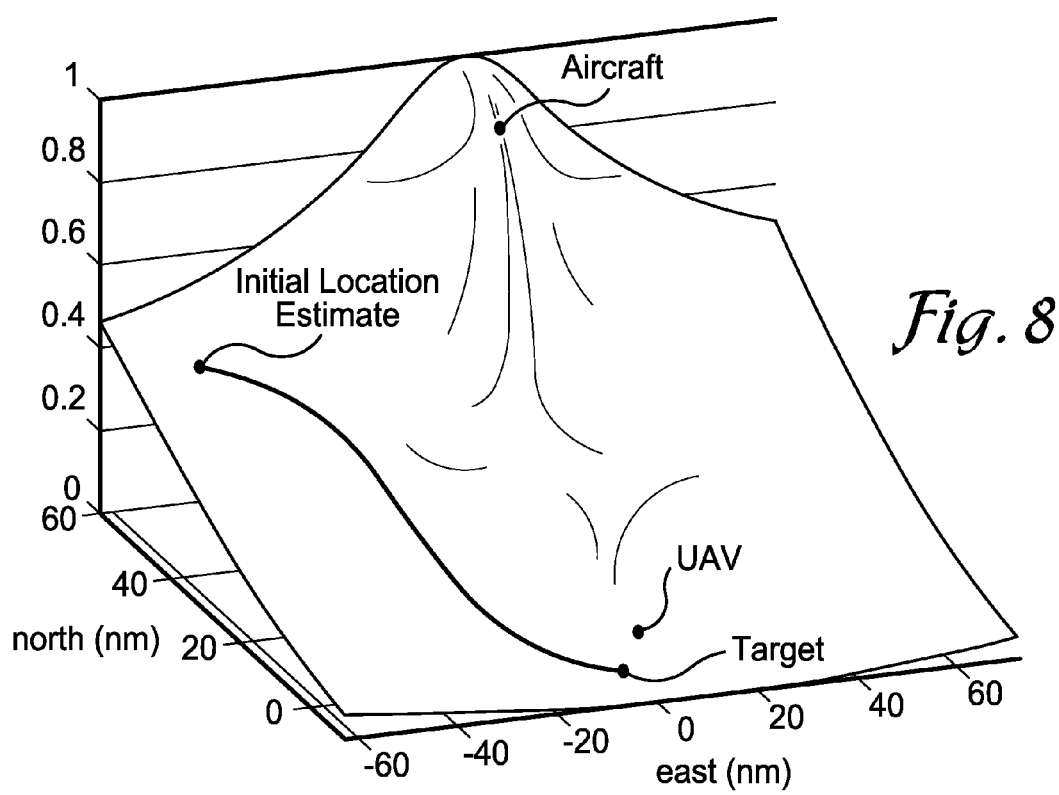
FIG. 8 is a three-dimensional graph illustrating a convergence path along a surface defined by the objective function according to the example scenario of FIG. 5.

The Levenberg-Marquardt's convergence path from initial location 2 is illustrated in FIG. 8. Specifically, FIG. 8 illustrates the path followed by the location estimate on a surface plot of the objective function, where the objective function values have been normalized so that the largest value is 1. In this example, initial location 2 is over 70 nautical miles from the true target location.

Figure 9:
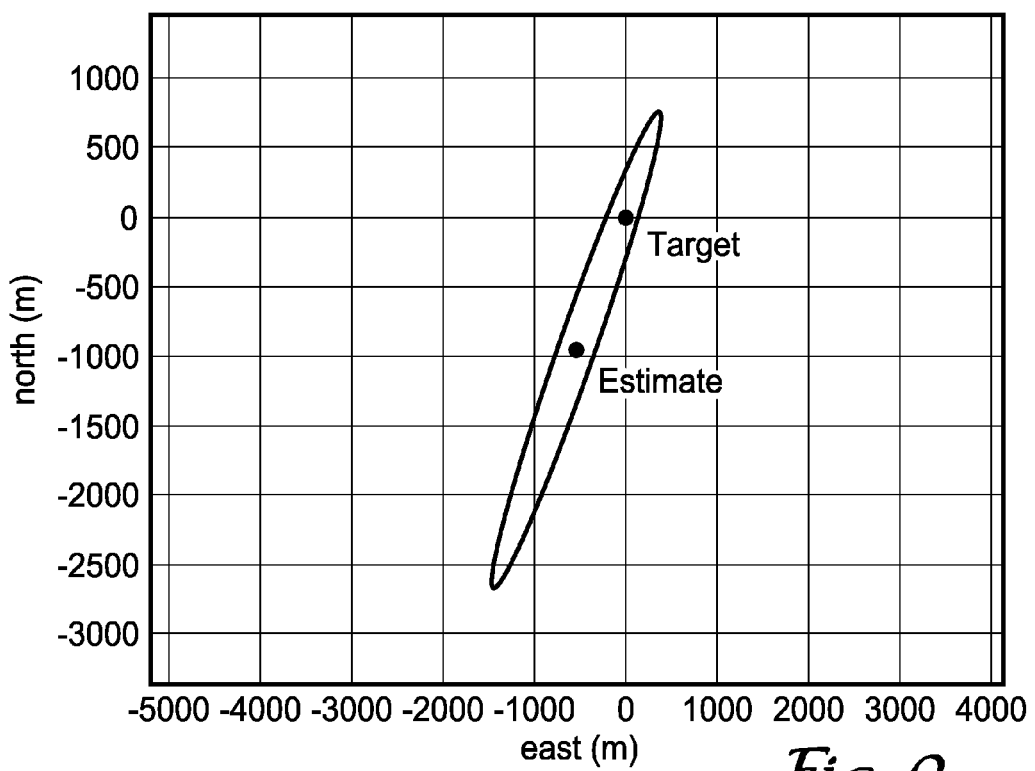
FIG. 9 is a graph of a location estimate and an error ellipse according to the example scenario of FIG. 5.

The location estimate and error ellipse computed by the Levenberg-Marquardt algorithm are shown in FIG. 9. In this example, the 95% Ellipltical Error Probable is 1951 meters after 87 iterations.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A method for determining a geolocation of a non-cooperative target, the method comprising:
   a) acquiring with at least one collector one or more actual signal measurements corresponding to a signal emitted from an emitter on the target, wherein the one or more signal measurements include at least one of a direction of arrival, a target range, a time difference of arrival, a range rate, a range sum, and a frequency difference of arrival;
   b) receiving with a processing device the actual signal measurements and navigational data regarding the collector;
   c) calculating an estimated target location of the non-cooperative target with the processing device as a solution to a non-linear optimization problem using a globally convergent optimization algorithm, wherein an objective function to be minimized is a weighted sum-of-squares of differences between the actual signal measurements and calculated values corresponding to signal measurements that theoretically should be produced for a particular target location; and
   d) outputting the estimated target location to a display configured to display the estimated target location or to another electronic device.

2. The method of claim 1, wherein the globally convergent algorithm is a Levenberg-Marquardt algorithm.

3. The method of claim 1, further comprising approximating the solution to the nonlinear optimization problem by iteratively updating the globally-convergent nonlinear optimization algorithm for a predefined number of iterations or until a comparison of a current output to a previous output of the globally-convergent nonlinear optimization algorithm results in a predefined condition being met.

4. A method for determining a geolocation of a non-cooperative target, the method comprising:
   a) acquiring with a processing device one or more signal measurements corresponding to a signal emitted from an emitter on the target, wherein the one or more signal measurements include at least one of a direction of arrival, a target range, a time difference of arrival, a range rate, a range sum, and a frequency difference of arrival;
   b) forming a measurement z vector comprising the one or more signal measurements arranged in any order, wherein each signal measurement corresponds with a function of the geolocation of the non-cooperative target;
   c) calculating an h vector using the processing device by calculating what each value of the measurement z vector would equal if the signal was emitted from a current estimated target location;
   d) subtracting the h vector from the measurement z vector using the processing device to solve for a first intermediate result;
   e) determining the product of the first intermediate result, an inverse of a measurement error covariance matrix corresponding to the measurement z vector, a transposed gradient of h evaluated at the current estimated target location, an inverse of a positive definite matrix $M_k$, and a positive scalar parameter $\alpha_k$ using the processing device to solve for a second intermediate result;
   f) adding the current estimated target location to the second intermediate result using the processing device to solve for an updated estimated target location;
   g) resetting the current estimated target location to equal the updated estimated target location using the processing device;
   h) repeating steps c-g until the processing device determines that a particular condition is met; and
   i) outputting a most recent value of the updated estimated target location as the geolocation of the non-cooperative target.

5. The method of claim 4, wherein matrix $M_k$ is at least one of a Hessian matrix and an augmented Hessian matrix of h, such that if the Hessian matrix is not positive definite then a positive scalar multiple of an identity matrix is added to the Hessian matrix so that the sum corresponding to matrix $M_k$ is positive definite.

6. The method of claim 4, further comprising using a backtracking line search to determine the positive scalar parameter $\alpha_k$ such that a minimum variance optimization function g evaluated at the updated estimated target location is less than the function g evaluated at the current estimated target location.

7. The apparatus of claim 4, wherein the particular condition to be met corresponds with completing a particular number of repetitions of steps c-g or a comparison of the current estimated target location and the updated estimated target location satisfying desired difference parameters or desired ratio parameters.

8. A system for determining a geolocation of a non-cooperative target, the system comprising:
   a) one or more collectors configured to acquire one or more signal measurements corresponding to a signal emitted from an emitter on the target; and
   b) a processing device configured to receive the signal measurements from the one or more collectors and output a target location estimate, the processing device comprising:
      a Levenberg-Marquardt module configured to:
         receive a set of data including a measurement vector comprising values corresponding with the one or more signal measurements, an error covariance matrix comprising values corresponding with a statistically determined error of each value within the measurement vector, navigational data corresponding with the one or more collectors, and a current assumed target location, and
         iteratively updating an updated assumed target location using the set of data and a Levenberg-Marquardt algorithm;
      a comparison module configured to output a most recent value of the updated assumed target location calculated by the Levenberg-Marquardt module once a particular condition is met,
      wherein the Levenberg-Marquardt module comprises a first intermediate result module configured to calculate an h vector comprising values corresponding with what each value of the measurement vector would equal if the signal was emitted from the current estimated target location; and to subtract the h vector from the measurement vector to solve for a first intermediate result,
      wherein the Levenberg-Marquardt module further comprises a second intermediate result module configured to determine the product of the first intermediate result, an inverse of a measurement error covariance matrix corresponding to the measurement vector, a transposed gradient of h evaluated at the current assumed target location, an inverse of a positive definite matrix $M_k$, and a positive scalar parameter $\alpha_k$ to solve for a second intermediate result.

9. The apparatus of claim 8, wherein the one or more signal measurements include at least one of a direction of arrival, a target range, a time difference of arrival, a range rate, a range sum, and a frequency difference of arrival.

10. The apparatus of claim 8, wherein the particular condition required by the comparison module corresponds with a particular number of iterations having occurred or corresponds with a comparison of the current assumed target location and the updated assumed target location satisfying desired difference parameters or ratio parameters.

11. The apparatus of claim 8, wherein the Levenberg-Marquardt module further comprises an assumed target location updater module configured to add the current assumed target location to the second intermediate result to solve for the updated assumed target location.

12. The apparatus of claim 8, wherein matrix $M_k$ is at least one of a Hessian matrix and an augmented Hessian matrix of h, such that if the Hessian matrix is not positive definite the Levenberg-Marquardt module is configured to add a positive scalar multiple of an identity matrix to the Hessian matrix so that the sum is positive definite.

13. The apparatus of claim 8, wherein the Levenberg-Marquardt module is configured to use a backtracking line search that determines the positive scalar parameter $\alpha_k$ such that a minimum variance optimization function g evaluated at the updated estimated target location is less than the function g evaluated at the current estimated target location.

14. A computer program stored on a computer-readable medium device for determining an estimated target location of a non-cooperative target, the computer program comprising:
   a first code segment configured for receiving actual signal measurements corresponding to a signal emitted from an emitter on the non-cooperative target and navigational data corresponding with at least one collector obtaining the signal measurements; wherein the one or more signal measurements include at least one of a direction of arrival, a target range, a time difference of arrival, a range rate, a range sum, and a frequency difference of arrival;
   a second code segment configured for calculating the estimated target location using a Levenberg-Marquardt algorithm with a current estimated target location, the signal measurements, and the navigational data to solve for an updated estimated target location and to iteratively replace the current estimated target location with the updated estimated target location to solve for a next updated estimated target location; and
   a third code segment configured for outputting the updated estimated target location to a display or another electronic device when the updated estimated target location meets a particular condition or a particular number of iterations of the Levenberg-Marquardt algorithm have been performed.

15. The computer program of claim 14, further comprising:
   a fourth code segment configured for forming a measurement z vector comprising the actual signal measurements arranged in any order, wherein each signal measurement corresponds with a function of an actual geolocation of the non-cooperative target;
   a fifth code segment configured for calculating an h vector by calculating what each value of the measurement z vector would equal if the signal was emitted from the current estimated target location;
   a sixth code segment configured for subtracting the h vector from the measurement z vector to solve for a first intermediate result;
   a seventh code segment configured for determining the product of the first intermediate result, an inverse of a measurement error covariance matrix corresponding to the measurement z vector, a transposed gradient of h evaluated at the current estimated target location, an inverse of a positive definite matrix $M_k$, and a positive scalar parameter $\alpha_k$ using the processing device to solve for a second intermediate result;

a eighth code segment configured for adding the current estimated target location to the second intermediate result using the processing device to solve for the updated estimated target location;

a ninth code segment configured for resetting the current estimated target location to equal the updated estimated target location using the processing device; and a tenth code segment configured for returning the current estimated target location to be processed by the fifth code segment unless the third code segment has output the updated estimated target location.

16. The computer program of claim 15, wherein matrix $M_k$ is an augmented Hessian matrix of h, augmented such that matrix $M_k$ is positive definite.

17. The computer program of claim 15, further comprising a code segment configured for determining the positive scalar parameter $\alpha_k$ such that a minimum variance optimization function g evaluated at the updated estimated target location is less than the function g evaluated at the current estimated target location.

* * * * *